Aug. 5, 1952
A. RAPPL
2,606,086
PISTON PACKING RING FOR LUBRICATION
Filed March 30, 1946
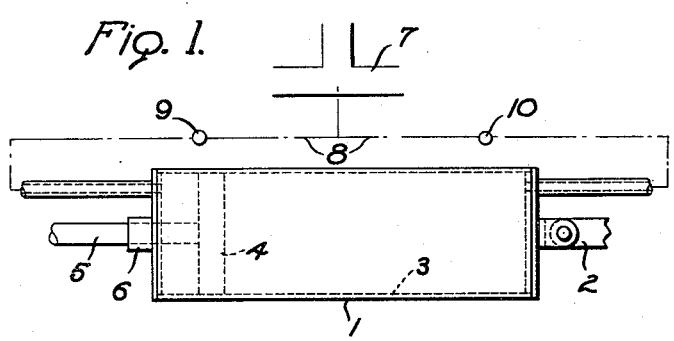
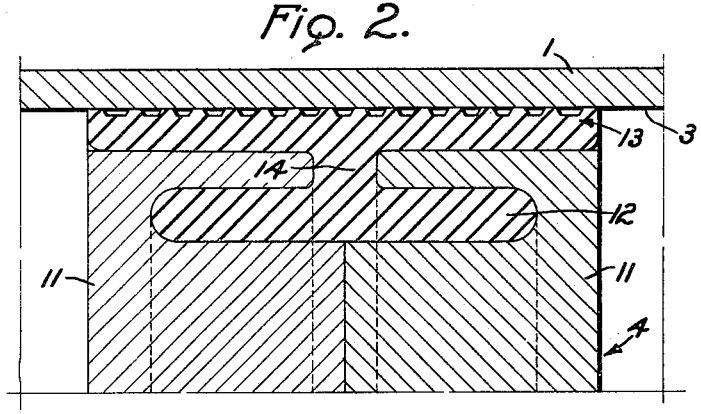
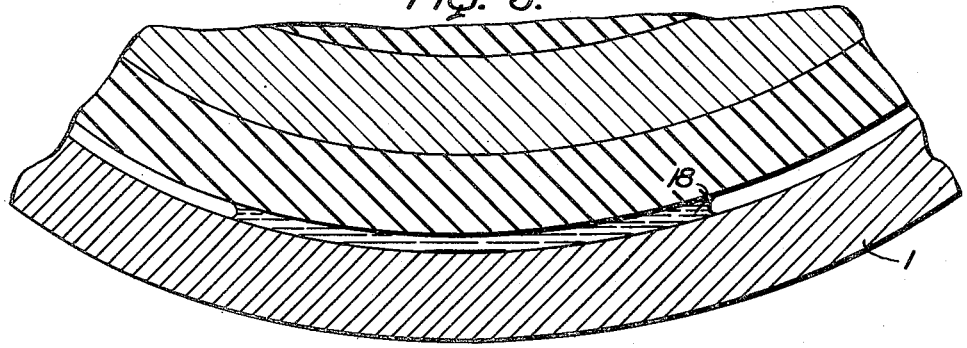
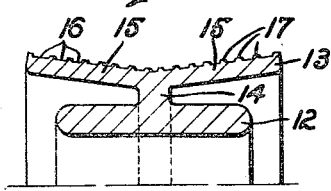
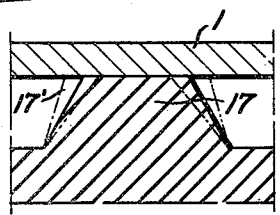
INVENTOR
Anton Rappl
BY
Bean, Brooks, Buckley & Bean
ATTORNEYS Patented Aug. 5, 1952

2,606,086

UNITED STATES PATENT OFFICE 2,606,086

PISTON PACKING RING FOR LUBRICATION

Anton Rappl, Eggertsville, N. Y., assignor to Trico Products Corporation, Buffalo, N. Y.

Application March 30, 1946, Serial No. 658,482

1 Claim. (Cl. 309—45)

This invention relates to a pneumatic motor and more particularly to an improved packing for the fluid responsive element thereof.

The use of rubber and especially a synthetic substitute has long been employed as a packing means for the reciprocating piston of an air motor or pump, and in order to reduce the cling of the rubber upon the chamber wall a lubricant has been applied. However, during operation the lubricant is soon swept aside and deposited on the wall of the motor chamber at or beyond the opposite limits of piston travel. Consequently, the chamber wall will become somewhat dry and cause the rubber to cling abnormally, thereby placing more load upon the motor.

The primary object of the present invention is to provide a synthetic rubber or rubber-like packing for a pneumatic motor which will maintain a lubricated contact with the chamber wall to increase the period of efficiency of the motor over a prolonged interval of time.

Further, the invention has for its object to provide an improved packing of this character which will be self-lubricating and capable of replenishing the lubricant supply in a practical manner.

Again, the invention has for its object to provide a pneumatic motor with a rubber sealed piston designed for maintaining a freedom of response of the piston to the operating pressure differential whereby the motor operation will be easy and rapid.

The foregoing and other objects will manifest themselves as the following description progresses, reference being had to the accompanying drawing, wherein:

Fig. 1 is a side elevation of a pneumatic motor;

Fig. 2 is an enlarged fragmentary view in longitudinal section more clearly disclosing the present invention;

Fig. 3 is an exaggerated showing in transverse section through a part of the motor;

Fig. 4 is a diagrammatic illustration more clearly depicting the packing in operation; and Fig. 5 is a detailed sectional view of the packing per se.

Referring more particularly to the drawing, the numeral 1 designates a motor casing suitably mounted at one end by a bracket 2 and having a chamber 3 in which is slidably disposed a piston 4, the latter having its rod 5 suitably extended through a packing gland 6 in the opposite end of the chamber. The numeral 7 diagrammatically represents the intake manifold of an internal combustion engine which serves as a source of suction. The source of operating suction may, of course, comprise any suitable means and such source is connected by conduits 8 communicating through control valves 9 and 10 with the opposite ends of the chamber.

The piston is herein depicted as having separable sections 11 adapted to clampingly embrace an internal mounting flange 12 of the packing member generally indicated at 13, such packing member being formed of rubber, a term used herein to define a synthetic rubber substitute. The packing member is an annulus and is joined to the inwardly disposed annular flange 12 by a ring-like web 14. The packing member may be normally shaped with oppositely flared conical portions 15 so that when placed within the chamber 3 the outer marginal parts will be urged firmly against the chamber wall.

The wall engaging surface of the annular packing ring is formed with a plurality of shallow circumferentially extending grooves 16 which, in turn, provide like extending fine ribs or ridges 17 which have sealing contact with the chamber wall. These fine ridges, which are greatly exaggerated in the illustration, space the bottom walls of the grooves slightly greater than the distance of a hair's breadth from the chamber wall or a distance sufficient to substantially maintain capillary attraction. In practice, it has been found that a ridge of approximately .010 of an inch in height serves the intended purpose and function in a satisfactory and practical manner.

By the provision of this formed periphery, the lubricant will be confined to the different peripheral grooves or channels as the ridges wipe back and forth on the chamber wall. Instead of the lubricant being entirely wiped aside beyond the limits of piston travel, the trapped portions between the ridges will be alternately applied to the confining ridges to maintain a lubricated sealing contact with the chamber wall. Excess lubricant may collect at the lower side, as indicated at 18 in Fig. 3. When the piston moves, the ridges 17 may flex back and forth, as indicated at 17' in Fig. 4, so that the lubricant may be worked out to the most advantageous point. This will assist the capillary action in distributing the required film of lubricant upwardly over the ribs for sealing their contact with the chamber wall. Consequently, the piston will respond freely and quickly when subjected to the operating pressure differential.

To insure the maintenance of this lubricated contact with the chamber wall over a long period of time, the rubber body of the packing member is impregnated with the lubricant. This impregnation may be effected by introducing the lubricant, such as oil or graphite, into the ingredients for the synthetic rubber at the time of molding the packing member. When so incorporated in the rubber the lubricant will very slowly ooze or bleed from the body and will collect in a film upon the ring surface sufficient to maintain the desired lubricated contact. Furthermore, when the motor is operating, the packing member will be subjected to the fluid pressure and thereby be firmly pressed outwardly against the chamber wall to encourage the bleeding of the lubricant through the peripheral surface. The amount of lubricant which collects upon the peripheral surface of the ring may vary for different usages. For example, in conducted laboratory tests the impregnated lubricant will manifest itself and the oily film reappear upon the surface after the lapse of a half day or so following the step of wiping off the previous film. This film as it collects will move outwardly over the ridges into contact with the chamber wall. In this connection it will be observed that the relatively larger grooves will provide ample surface area for the bleeding action to release sufficient lubricant for maintaining the desired fluid sealed and lubricated contact with the chamber wall for normal motor operation.

The advantage of this improved packing is that a substantially instantaneous response of the motor is obtained with a minimum friction developing between the rubber packing and the chamber wall.

The packing is therefore practical, and while the foregoing description has been given in detail it is not intended by way of limitation since the inventive principles involved are capable of assuming other physical embodiments without departing from the spirit of the invention and the scope of the appended claim.

What is claimed is:

A sliding piston packing ring molded wholly of synthetic rubber with a surface extruding lubricant as one of the ingredients capable of a retarded bleeding of the same through the peripheral surface of the ring for lubricating its sliding contact with a chamber wall, the rubber being readily elastic for yielding back and forth as the piston is reciprocated, the periphery of the ring having minute circumferential ridges of a depth sufficiently small to maintain capillary attraction to assist the distribution of the bled lubricant upon the surface area of the ring.

ANTON RAPPL.

REFERENCES CITED

The following references are of record in the file of this patent:

UNITED STATES PATENTS

| Number | Name | Date |
| --- | --- | --- |
| 334,579 | Garlock | Jan. 19, 1886 |
| 713,964 | Clark | Nov. 18, 1902 |
| 1,057,112 | Bavier | Mar. 25, 1913 |
| 1,273,738 | Christensen | July 23, 1918 |
| 1,330,979 | Christensen | Feb. 17, 1920 |
| 1,613,410 | Post | Jan. 4, 1927 |
| 2,108,339 | Kirk | Feb. 15, 1938 |
| 2,218,638 | Christensen | Oct. 22, 1940 |

FOREIGN PATENTS

| Number | Country | Date |
| --- | --- | --- |
| 2,713 | Great Britain | of 1909 |

OTHER REFERENCES

"Crude Rubber and Compounding Ingredients" by Henry C. Pearson, published by The India Rubber Publishing Co. (1909) of N. Y., page 99, lines 11–20.

The Neoprene Notebook, volume I, No. 5, July 1938, pages 17–19.